United States Patent [19]

Yoneda

[11] Patent Number: 4,583,959
[45] Date of Patent: Apr. 22, 1986

[54] DAMPER DISC

[75] Inventor: Kazuhiko Yoneda, Katano, Japan

[73] Assignee: Kabushiki Kaisha Daikin Seisakusho, Japan

[21] Appl. No.: 528,477

[22] Filed: Sep. 1, 1983

[30] Foreign Application Priority Data

Sep. 16, 1982 [JP] Japan .................. 57-140892[U]

[51] Int. Cl.⁴ .............................................. F16D 3/14
[52] U.S. Cl. .................... 464/68; 192/106.2
[58] Field of Search ............... 192/106.1, 106.2; 464/62, 66, 68

[56] References Cited

U.S. PATENT DOCUMENTS

| 2,636,363 | 4/1953 | Nutt | 464/68 |
| 3,817,362 | 6/1974 | Rist | 464/68 X |
| 4,406,357 | 9/1983 | Nagano et al. | 192/106.2 |

FOREIGN PATENT DOCUMENTS

| 45-14604 | 5/1970 | Japan | 192/106.2 |
| 45-27486 | 9/1970 | Japan | 192/106.2 |
| 45-27487 | 9/1970 | Japan | 192/106.2 |
| 45-28122 | 9/1970 | Japan | 192/106.2 |
| 46-14761 | 4/1971 | Japan | 192/106.2 |
| 2093565 | 9/1982 | United Kingdom | 464/68 |

Primary Examiner—Stuart S. Levy
Assistant Examiner—Daniel P. Stodola
Attorney, Agent, or Firm—Armstrong, Nikaido, Marmelstein & Kubovcik

[57] ABSTRACT

A damper disc disposing a pair of integrally interconnected side plates on both sides of an annular flange of a hub, interconnecting the side plate and the flange by means of a torsion spring, and interposing a friction member between an inner peripheral part of the annular flange and an inner peripheral part of the side plate; a friction plate and a wave spring being interposed in layers as friction members in either or both of between the annular flange and the both side plates, the friction plate being rotatably fixed to any one of the annular flange and the side plate and the wave spring being rotatably fixed to the other of them, and a mating surface of the friction plate on the side of the wave spring being formed into a waved surface corresponding to the wave spring.

2 Claims, 6 Drawing Figures

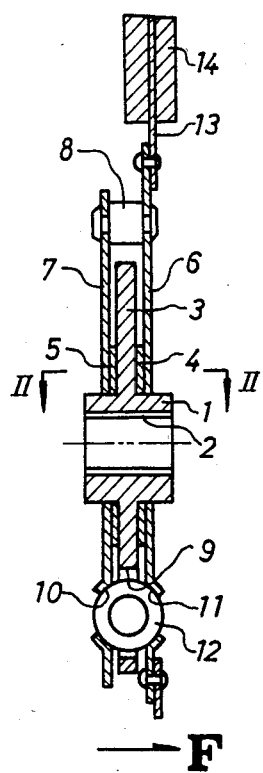
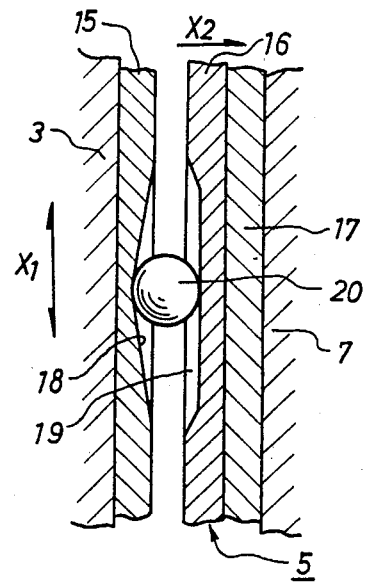
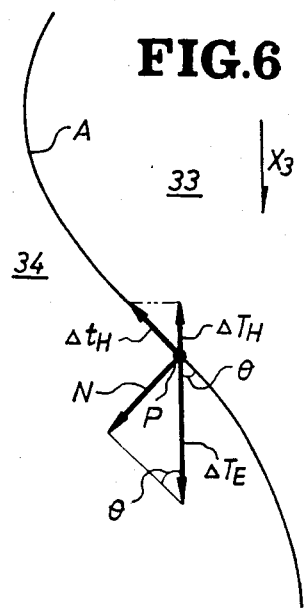

DAMPER DISC

FIELD OF THE INVENTION

This invention relates mainly to a damper disc assembly suitable for a clutch disc for use in a friction clutch of an automobile etc.

DESCRIPTION OF THE PRIOR ART

A general damper disc employed in an automobile clutch disc is illustrated in FIG. 1, wherein the arrow F indicates the front side. In FIG. 1 showing a sectional vertical schematic side view, a spline hub 1 has on its inner peripheral surface a spline 2 adopted to fit onto an output shaft (not shown), and has on integrally radially extending annular flange 3 on its outer peripheral surface. Hysteresis torque generating parts 4,5 (friction material etc.) are arranged along inner peripheral portions on both sides of the flange 3, and a pair of annular side plates 6,7 (a clutch plate and a retaining plate) are aranged on both sides (front and rear) of the flange 3 in such a manner as to sandwich the torque generating parts 4, 5. At portions near the outer peripheries of the flange 3 and both plates 6, 7, plural window holes 9, 10, 11 (only one is shown for each) are provided with spaces left therebetween in the circumferential direction of the clutch disc, respectively. The window holes 9, 10, 11 are facing in the direction (lateral direction of FIG. 1) parallel to the center axis of the output shaft, and compression coil springs 12 (torsion springs) are fit in each set of three window holes 9, 10, 11. Each spring 12 extends in the circumferential direction of the clutch disc, the flange 3 and the plates 6, 7 being interconnected through the spring 12. Outer peripheral portions of the two plates 6, 7 are interconnected to each other by a stop pin 8. An inner peripheral portion of a cushioning plate 13 is fastened to an outer peripheral portion of the plate 6 (clutch plate), and annular facings 14 are bonded to both sides of the plate 13. When a not-shown pressure plate presses the facing 14 against a flywheel of an engine, a torque is transmitted from the flywheel through the facing 14, the plate 13, the plates 6, 7, the spring 12, the flange 3, and the hub 1 to the output shaft. In this case, the spring 12 is compressed corresponding to the transmitting torque and the side plates 6, 7 are twisted relatively to the flange 3, so that a slip occurs in the torque generating parts 4, 5. This slip produces a hysteresis torque due to the twisting-torque/twisting-angle action. Said hysteresis absorbs torque vibration, thus preventing abnormal vibrations and abnormal sounds in a power transmitting mechanism.

Generally, a suitable composition is employed for the hysteresis generating parts 4 and 5. For example, a friction washer may be used comprising a friction member of asbestos or the like, and is merely pressed against the annular flange 3 by means of a conical spring. In this conventional construction, a desirable value of hysteresis torque is not generated. The pressure of the conical spring is uniform, and the amount of twisting between the flange 3 and the side plates 4 and 5 is limited to a fixed value of angular variation. Further, if sufficient friction is not generated by the conical spring, there is inadequate energy absorbing effect produced by the structure.

To cope with this disadvantage, an improvement to a conventional clutch plate assembly has been known, and has the purpose of generating an appropriate value of hysteresis corresponding to a value of twisting torque for providing a better vibration absorbing effect. Such an improvement is illustrated in FIG. 2, which corresponds to a sectional view taken on line II of FIG. 1.

As a substitute for the hysteresis torque generating part 5, two disc plates 15, 16 and a friction plate 17 are put together, and recessions 18, 19 are formed on plural places in the circumferential direction (in the direction of arrow $X_1$ on surfaces of the disc plates 15, 16 opposed each other. One recession 18 is so shaped that its depth becomes shallower gradually from the central portion in the circumferential direction, the other recession 19 has the same circumferential length with that of the recession 18 but has an approximately constant depth, and a metal ball 20 is interposed between the both recessions 18, 19. When the plate 7 is twisted in either direction of $X_1$ relatively to the flange 3, the friction plate 17 rubs against the side plate 7 and at the same time the disc plate 16 tends to rotate together with it; thereby the ball 20 rolls and moves to a shallower part of the recession 18 to produce a load in the direction of the arrow $X_2$, pressing the plate 17 against the plate 7, thus increasing a friction force. It is so devised that the load in the direction of $X_2$ becomes greater with an increase in a twisting angle of the disc, and the friction force exerted by the plate 17 changes to increase the hysteresis torque.

In the above-mentioned conventional construction, however, there is the disadvantage that the components are liable to wear and are not durable due to extremely small contact areas between the ball 20 and the disc plates 15, 16. Further, if an initial load of the friction plate 17 against the side plate 7 in the direction of $X_2$ is insufficient, the disc plate 16 tends not to rotate together therewith and an excessively small hysteresis torque is not obtainable. Moreover, there is also the disadvantage that the initial load of the plates 15, 16, and 17 becomes insufficient in a short period due to wear etc. in the vicinity of the ball 20.

SUMMARY OF THE INVENTION

An object of this invention is to provide a damper disc, in consideration of the above-mentioned disadvantages, which provides an appropriate quantity of hysteresis torque corresponding to variation of the twisting torque, has always a good vibration energy absorbing effect, but which is durable in operation and reliable in function.

In order to accomplish the above objects, the present invention provides a damper disc clutch assembly having an annular flange extending radially outwardly on a hub, mounting a pair of integrally interconnected side plates on each side of the annular flange, interconnecting the side plates and the flange by means of torsion springs at spaced circumferential points, interposing a friction member between an inner peripheral part of the annular flange and an inner peripheral part of a side plate, interposing a friction plate, and a wave spring as friction members between the annular flange and the other side plate, with the friction plate rotatably fixed to either the annular flange or the side plate and the wave spring rotatably fixed to the other of the annular flange and side plate, and the friction plate being provided with a mating surface on the side adjacent the wave spring, said mating surface being formed into a continuous waved surface corresponding to the continuous wave of the wave spring.

BRIEF DESCRIPTION OF THE DRAWINGS

FIG. 1 is a partially sectional vertical schematic side view of a general damper disc employed in a conventional clutch disc, FIG. 2 is a magnified fragmentary sectional view corresponding to a sectional view taken on the line II—II of FIG. 1 but showing a conventional alternative embodiment, FIG. 6 is a schematic view for explaining functioning characteristics.

DETAILED DESCRIPTION OF THE INVENTION

Figure 3:
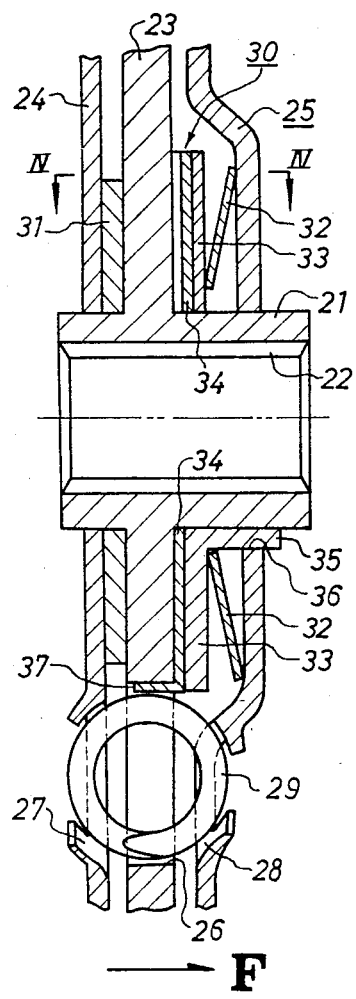
FIG. 3 is a sectional vertical side view of the damper disc of this invention.
Figure 4:
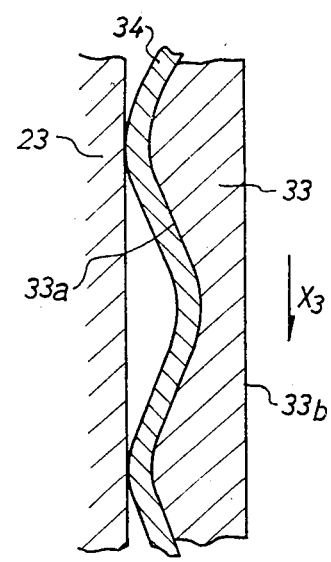
FIG. 4 is a sectional view taken on line IV—IV of FIG. 3.

In FIG 3, a hub 21 is provided with an internal spline 22 adapted to fit onto an output shaft (not shown) and is provided with an annular flange 23 integrally extending radially outwardly toward an outer peripheral surface. A pair of annular side plates 24 and 25 are disposed approximately in parallel with each other on both sides (rear side and front side) of the flange 23, with inner peripheral portions of both side plates 24 and 25 fitting on but freely rotatable on the peripheral surface of the hub 21, with outer peripheral portions thereof integrally connected with stop pins (not shown). Near the outer peripheries of the flange 23 and both plates 24 and 25 a plurality of window holes 26, 27, and 28, respectively, (only one is shown for each) with spaces left therebetween in the circumferential direction of the damper disc, and compression springs 29 (torsion springs) are fit into each set of the three window holes 26, 27, and 28. The above-mentioned structure is similar to that of FIG. 1. Further, in FIG. 3 a friction plate 30 is disposed between the flange 23 and the side plate 25, and a conventional disc shaped friction plate 31 is disposed between the annular flange 23 and the side plate 24. This friction plate is preferably comprised of an asbestos material or the like. A conical spring 32, a friction plate 33, and a wave spring 34 are disposed in this order between the side plate 25 and the annular flange 23. The conical spring 32 is made, for example, of an annular piece of trapezoidal conical SK steel, its outer peripheral edge pressing upon the side plate 25 and its inner peripheral edge pressing upon the friction plate 33 to pressurize the friction plate 33 against the annular flange 23. The friction plate 33 is made, for example, of an annular plate of SPHC steel or the like, having several axially extending projections 35 projecting from its inner peripheral edge to rotatably interconnect with the side plate 25. Each projection 35 fits into a notch 36 provided on an inner peripheral portion of the side plate 25, the friction plates thus being rotatably fixed to the side plate 25. The wave spring 34 is rotatably fixed to the annular flange 23, having a tongue 37 formed on an outer peripheral end of the spring and affixed or clamped to an inner periphery of the window hole 26 of the annular flange 23. Further, as shown in FIG. 4, the friction plate 33 has a mating surface 33a provided with a waved surface adjacent to and corresponding with that of the wave spring. As shown in FIG. 4 in cross-section the continuous wave of the spring 34 match and mate with the waved surface of the friction plate 33.

Figure 5:
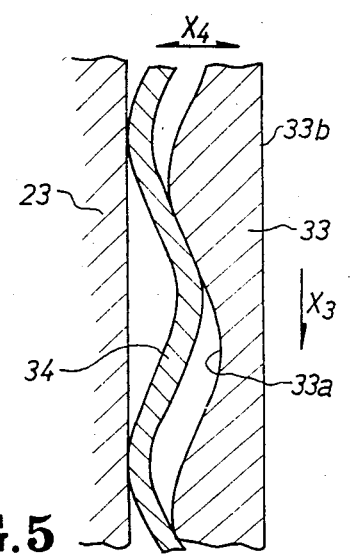
FIG. 5 is a similar sectional view corresponding to FIG. 4 showing one functioning state.

FIG. 5 shows the same assembly with the waves of the spring 34 slightly out of alignment with the waves of the surface 33a of the friction plate 33.

The function of the embodiment of the invention in FIGS. 3, 4 and 5 will now be described. When this embodiment is employed in an automobile clutch disc assembly, for example, torque transmitted from an engine through a facing provided at an outer periphery is transmitted through the side plates 24, 25, the torsion springs 29, the annular flange 23, the hub 21 to an output shaft (not shown), resembling the functioning of the conventional embodiment shown in FIG. 1. At the same time the torsion springs 29 are compressed corresponding to the transmitted torque, and the side plates 24, 25 are twisted relatively to the annular flange 23. At this point deviation (friction) as shown in FIG. 5, for example, is produced between the friction plate 33 rotatably fixed to the side plate 25 and the wave spring 34 rotatably fixed to the annular flange 23, and the friction caused by this deviation produces a hysteresis torque to absorb the torque vibration.

In order to afford a better understanding of the hysteresis torque characteristics of the damper disc according to this invention, the state of friction is considered schematically as shown in FIG. 6. In FIG. 6, the curve A represents a mating surface of the friction plate 33 and the wave spring 34, and it is supposed that the right side of the figure is the plate 33 and the left side thereof is the wave spring 34. When a twisting torque $T_E$ in the direction of arrow $X_3$ is applied to the damper disc of free state, a hysteresis torque $T_H$ at point P, for example, is expressed as follows:

A normal pressure N caused by a torque fluctuation $T_E$ (vibration) is $$N = \Delta T_E \sin \theta$$

A hysteresis torque fluctuation $\Delta T_H$ is $$\Delta T_H = \cos \theta \cdot \Delta t_H$$

where $$\Delta t_H = \mu \cdot \eta \cdot N$$

Thus, the following equation can be obtained.

$$\Delta T_H = \mu \cdot \eta \cdot \Delta T_E \sin \theta \cdot \cos \theta$$

where N is a normal pressure, $\theta$ is an inclination of mating surface at point P, $t_H$ is a hysteresis torque in the tangential direction, $\mu$ is a coefficient of friction, and $\eta$ is an efficiency. Consequently, it can be understood that the deviation of the twisting torque $T_E$ is in direct proportion to the deviation of the hysteresis torque $T_H$. Although no consideration is given in the above description, the deviation of the wave spring 34 in relation to the friction plate 33 produces a load which will function to force open both members in the direction $X_4$ of FIG. 5 similar to a cam action. It is clear that this load functions in such a manner as to increase a pressure therebetween, and that this load increases with an increase in the twisting angle. Therefore, the greater the twisting torque $T_E$ is, the larger the pressure will increase by means of the cam action and the larger the hysteresis torque $T_H$ will become. Further, since the wave spring 34 itself performs its own duty as a spring by being deformed, a load as exerted by this function of the spring is added to the pressure between the plate 33 and the spring 34.

As mentioned above, according to the present invention, the friction plate 33 and the wave spring 34 are interposed in layers as the friction member 30 in either or both locations between the annular flange 23 and the side plates 24, 25, and the friction plate 33 may be rotatably fixed to any one of the annular flange 23 and the side plate 25 and the wave spring 34 is rotatably fixed to the other of them, and the mating surface 33a of the friction plate 33 on the side of the wave spring 34 is formed into the waved surface corresponding to the wave spring 34; so that the advantage is obtainable that the advantageous vibration energy absorbing effect can always be provided owing to the hysteresis torque $T_H$ varying in conformity with the fluctuation of the twisting torque $T_E$. Moreover, there is the further advantage of durability if operation and reliability in function since there are no instances of point contact as in case of the the structure shown in FIG. 2 using the conventional metal ball. Furthermore, since the wave spring 34 has not only an effect as a spring but functions similar to a cam in relation to the friction plate 33, it is not necessary to use a separate member having an inclining surface, the number required components can be reduced, and the structure is simplified.

In embodying the present invention, a back face 33b (FIG. 4) of the friction plate 33 at the side of the conical spring 32 may not necessarily be flat, and the manufacturing thereof will become easy if the back face is formed into a waved surface corresponding to the face 33a. Further, the wave spring 34 has the effect not only as a inclining surface but as the spring, so that the conical spring may be omitted if desired. The friction plate 33 can thus be disposed adjacent the side of the side plate 25 and the wave spring 34 may be disposed at the side of the flange 23 as shown in the embodiment of FIG. 3, or, they may be disposed in an opposite fashion. In such a case, the wave spring 34 may be rotatably fixed to the plate 25 and the friction plate 33 may be rotatably fixed to the flange 23 respectively. Further, the friction member 30 according to this invention is employed only on the side of the side plate 25 in the above-mentioned embodiment, but a similar structure may be provide on on either or both sides of the annular flange 23.

What is claimed is:

1. A torsion-damping device for an automotive clutch plate assembly, which comprises:
    (a) a splined hub with an integral annular flange extending radially outwardly therefrom,
    (b) a first and a second annular side plate mounted on said hub for free rotation thereon, with outer peripheral portions interconnected by a stop pin means,
    (c) torsion springs mounted in windows of said side plates and said annular flange, said side plates and annular flange being interconnected by said springs,
    (d) an annular friction member disposed on said hub between said first side plate and said annular flange,
    (e) a wave spring having a wavy surface around its circumference, a friction plate, and a conical spring disposed on said hub in sequence between said annular flange and said second side plate, and a radially extending surface of said friction plate adjacent said wave spring having waves corresponding to waves of said wave spring, and
    (f) said friction plate being rotatably fixed to said second side plate and said wave spring being rotatably fixed to said annular flange, whereby increases in the twisting torque between the waves of the spring and the waves of the friction plate will increase the pressure therebetween and thereby the hystersis torque.

2. A torsion-damping device as set forth on claim 1, in which a tongue is provided on an outer peripheral part of the wave spring, and the wave spring is rotatably fixed by bending the tongue int a window hole for a torsion spring of the annular flange.

* * * * *